May 29, 1928.  S. J. NORDSTROM  1,671,603
VALVE
Filed April 29, 1926
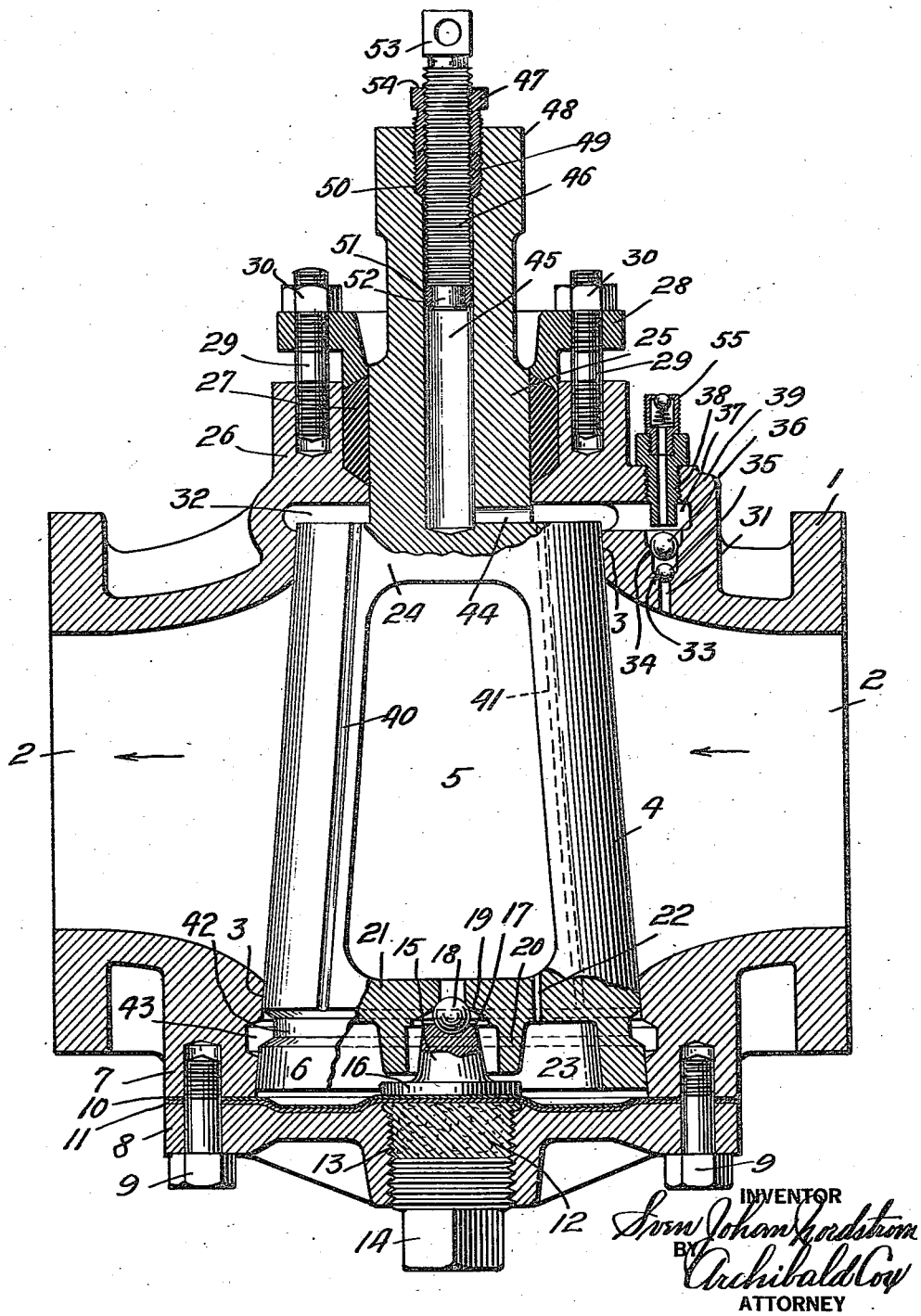
INVENTOR
Sven Johan Nordstrom
BY Archibald Cox
ATTORNEY Patented May 29, 1928.

1,671,603

UNITED STATES PATENT OFFICE.

SVEN JOHAN NORDSTROM, OF SAN FRANCISCO, CALIFORNIA, ASSIGNOR TO MERCO NORDSTROM VALVE COMPANY, OF SAN FRANCISCO, CALIFORNIA, A CORPORATION OF DELAWARE.

VALVE.

Application filed April 29, 1926. Serial No. 105,362.

The invention relates to an improvement in valves and more particularly to an improvement in plug valves used in lines handling oils or other liquids having lubricating qualities.

The object of the invention is to produce a plug valve of such construction that the liquid passing through the valve may be utilized for the twofold purpose of separating the plug from its seat and lubricating the bearing or seating surfaces of the plug and the valve seat. To this end the invention consists in the improved valve hereinafter described and particularly pointed out in the appended claims.

The preferred form of the invention is illustrated in the accompanying drawing which is a longitudinal section through the improved valve which comprises a body portion or casing 1 having a longitudinal passageway 2 therethrough and a tapered hole 3 formed transversely of the passageway to serve as a valve seat in which the movable member or tapered plug 4 is adapted to be seated. The hole 5 in the plug 4 registers with the passageway 2 when the valve is open. When the plug is in closed position, as shown in the drawing, it seals the passageway through the casing.

The large end 6 of the plug terminates within the flange-like side 7 of the casing. A cover 8 closes the opening through the flange 7 and is secured to the casing by the cap screws 9. A metal disk 10 and an asbestos disk 11 interposed between the flange 7 and the cover 8 seal the joint between them. The metal disk 10 overlies the asbestos disk 11 and protects it from the action of the fluids or liquids passing through the valve. The plug 4 is resiliently held against its seat by means of a wad of resilient material 12, such as shredded asbestos, contained in a central bore in the cover 8. A compression plug 14 screwed into the outer end of the bore 13 presses the wad of resilient material 12 against the center of the disks 10 and 11. A thrust bearing 15 of which the base 16 bears against the center of the inner face of the metal disk 10 is provided at its inner end 17 with a socket for a ball 18 which is seated in the bottom of a countersunk hole 19 in the ring-like projection 20 on the base 21 of the larger end of the plug. By turning the compression plug 14 the pressure with which the packing 12 holds the plug 4 against its seat through the antifriction bearing 18 may be adjusted. A hole 22 in the base 21 of the larger end of the plug 4 admits a portion of the liquid passing through the line to enter the annular space 23 in the larger end of the plug to assist in holding the plug against its seat.

The smaller end 24 of the plug is provided with a valve stem 25 which extends through the annular part 26 forming one side of the casing. A recess in the outer face of the side 26 of the casing is adapted to contain an annular packing 27 surrounding the valve stem. A gland 28 held in place on the casing by the studs 29 and nuts 30 serves to compress the packing 27 and establish a tight joint between the valve stem and the casing.

In order that the liquid in the system or line in which the valve is placed may be utilized for the purpose of separating the plug from its seat to introduce the liquid between the plug and its seat to lubricate the bearing or seating surfaces thereof, a conduit 31 is formed in the side of the valve casing adjacent the smaller end of the plug and connects the passageway 2 through the casing with a chamber 32 in the casing into which the smaller end 24 of the plug projects. The conduit 31 is provided with the two valve seats 33 and 34 in which are seated the ball valves 35 and 36, respectively. The liquid passes through the passageway 2 of the valve casing 1 in the direction indicated by the arrows. The pressure with which the liquid passes through the casing unseats the ball check valves 35 and 36 and permits a portion of the liquid to flow into and fill the chamber 32. The ball 36 is prevented from entering the space 37 connecting the chamber 32 with the conduit 31 by means of the lower end of a nipple 38 threaded into the shoulder 39 of the casing. When the ball 35 is unseated it strikes the inner side of the ball 36. When the balls are put under pressure in the reverse direction they seat themselves against their respective seats 33 and 34.

The bearing surfaces of the plug and the valve seat are lubricated from a pair of oppositely disposed lubricating grooves or channels 40 and 41 formed longitudinally in the bearing surface of the plug and connecting the chamber 32 with a circumferential groove 42 formed in the bearing surface of the larger end of the plug. The circumferential groove 42 cooperates with a circumferential recess 43 formed in the adjacent part of the casing. In order to put the lubricating liquid which enters these spaces under sufficient pressure to separate the plug from its seat against the holding action of the packing 12 and the pressure of the liquid in the space 23, the chamber 32 is connected by a transverse hole 44 in the base of the valve stem 25 with a longitudinal bore 45 in the valve stem. In the outer end of the valve stem is a compression screw 46 which has a fluid tight connection with the valve stem in the following manner: The screw 46 passes through a gland 47 threaded into the squared outer end 48 of the valve stem 25. The inner end of the gland 47 bears against a packing 49 contained in the inner end of the hole 50 in the valve stem in the outer end of which the gland 47 is threaded. By turning inwardly on the gland 47 the packing 49 is put under sufficient pressure to establish a tight joint between the screw 46 and the valve stem and at the same time prevents the accidental removal of the screw 46 from the valve. For this latter purpose a collar 51 of substantially the same diameter as the screw 46 is mounted loosely on the inner end 52 of the screw. The screw 46 may be turned outwardly until the collar 51 encounters the inner end of the packing 49, which will be of such composition as to prevent the collar from passing through it.

The mode of operation of the improved valve is as follows:—It is assumed that the valve is open with the plug 4 turned so that the hole 5 therein is in alinement with the passageway 2 through the casing, and that the screw 46 is turned outwardly partly or fully. The liquid passing through the valve in the direction of the arrows unseats the balls 35 and 36 and a portion flows into and fills the spaces between the plug and casing, namely, the circumferential grooves 42 and 43, the lubricating channels 40 and 41, and the chamber 32. The liquid also flows into and fills the bore 45 in the valve stem. If now it is desired to turn the plug to closed position and it is found that the plug is fast in its seat, the workman turns the screw 46 inwardly, thereby putting the liquid in the bore 45 and in the spaces between the plug and the casing under pressure and causing the ball valves 35 and 36 to be seated. By further turning the screw 46 inwardly the liquid in the chamber 32, in the channels 40 and 41 and in the grooves 42 and 43 is put under sufficient pressure to free the plug slightly from its seat so that it may be turned. While the plug is freed from its seat the liquid in the channels 40 and 41 oozes out laterally therefrom and is smeared over the bearing surfaces of the plug and the valve seat as the plug is turned. If it is found that the plug is fast in its seat when it is desired to turn the plug from open to closed position the plug is readily freed from its seat by again turning inwardly on the screw 46. When in the course of the continued use of the valve the workman has turned the screw 46 inwardly far enough to bring the head 53 of the screw in close proximity with the outer end 54 of the gland 47, the screw will be turned outwardly until the collar 51 encounters the inner end of the packing 49.

In case the valve should be used for a service in which the liquid passing through the valve has no lubricating qualities and it is desired to lubricate the valve, the nipple 38 may be provided with an attachment 55 for a grease gun by which lubricant under pressure is introduced into the spaces between the plug and the casing to lift the plug from its seat so that when the plug is turned the lubricant will smear over and lubricate and seal the contact joint between the plug and the valve seat.

Having thus described the invention what I claim as new is:—

1. A valve comprising, a casing having a passageway therethrough and a tapered valve seat formed transversely of the passageway, a tapered plug seated in the valve seat and having a hole adapted to register with the passageway, means associated with the larger end of the plug for resiliently holding the plug against the valve seat, a recess between the smaller end of the plug and the adjacent part of the casing, lubricating grooves in the seating surface between the plug and the valve seat connected with the recess, a valve-controlled conduit leading from the passageway to the recess to permit a portion of the liquid passing through the valve to enter the recess, and means for putting the liquid in the recess and lubricating grooves under pressure to separate the plug from the valve seat.

2. A valve comprising, a casing having a passageway therethrough and a tapered valve seat formed transversely of the passageway, a tapered plug seated in the valve seat and having a hole adapted to register with the passageway, means for resiliently holding the plug against its seat, a recess between the plug and the casing, a valve-controlled conduit extending from the passageway to the recess to permit a portion of the liquid passing through the valve to enter the recess, and means for putting the liquid in the recess under pressure to separate the plug from the valve seat.

3. A valve comprising, a casing having a passageway therethrough and a tapered valve seat formed transversely of the passageway, a tapered plug seated in the valve seat and having a hole adapted to register with the passageway, means associated with the larger end of the plug for holding the plug resiliently against the valve seat, a valve stem extending from the smaller end of the plug outwardly through the casing, means for making a tight joint between the valve stem and the adjacent part of the casing, a chamber in the casing into which the smaller end of the plug extends, longitudinal lubricating grooves in the surface of the plug connected at one end with the chamber, a circumferential groove in the larger end of the plug connected with the other ends of the longitudinal grooves, a circumferential recess in the adjacent part of the casing cooperating with the circumferential groove in the plug, a longitudinal bore in the valve stem connected with the chamber, a conduit in the casing extending from the passageway to the chamber to permit a portion of the liquid passing through the valve to enter the chamber and the spaces connected therewith, a check valve in the conduit to prevent back flow of liquid, and a screw in the outer end of the valve stem to put the liquid in the chamber and the spaces connected therewith under pressure to separate the plug from the valve seat.

4. A valve comprising, a casing having a passageway therethrough and a tapered valve seat formed transversely of the passageway, a tapered plug seated in the valve seat and having a hole adapted to register with the passageway, the part of the casing adjacent the smaller end of the plug being provided with a recess, a conduit leading from the passageway into the recess to permit a portion of the liquid passing through the valve to enter the recess, a check valve in the conduit to prevent backflow of the liquid, and means for putting the liquid in the recess under pressure to separate the plug from the valve seat.

5. A valve comprising, a casing having a passageway therethrough and a tapered valve seat formed transversely of the passageway, a tapered plug seated in the valve seat and having a hole adapted to register with the passageway, means for trapping a portion of the liquid passing through the valve, and means for putting the trapped liquid under greater pressure than the pressure of the liquid passing through the valve for separating the plug from its seat.

SVEN JOHAN NORDSTROM.